J. L. RAWSON.
ELECTRIC LIGHT ADJUSTER.
APPLICATION FILED OCT. 2, 1912.
1,071,957. Patented Sept. 2, 1913.
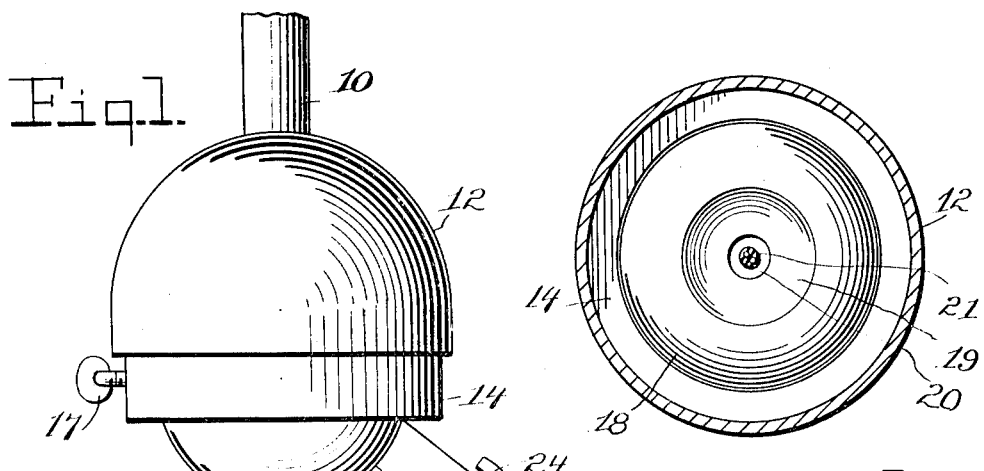
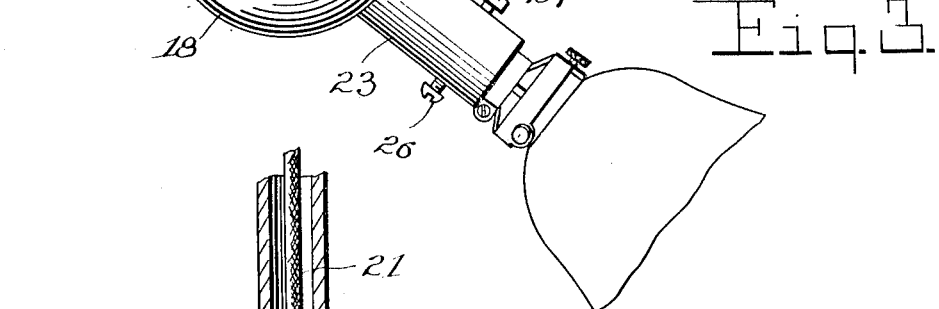
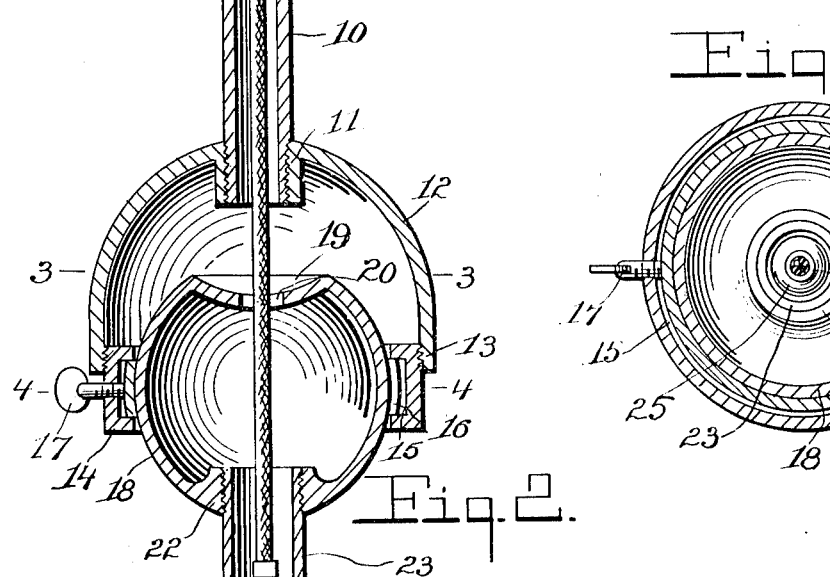
Inventor
J. L. Rawson
Attorneys

UNITED STATES PATENT OFFICE.

JUSTIN L. RAWSON, OF NEW BEDFORD, MASSACHUSETTS.

ELECTRIC-LIGHT ADJUSTER.

1,071,957.   Specification of Letters Patent.   Patented Sept. 2, 1913.

Application filed October 2, 1912. Serial No. 723,607.

*To all whom it may concern:*

Be it known that I, JUSTIN L. RAWSON, a citizen of the United States, residing at New Bedford, in the county of Bristol, State of Massachusetts, have invented certain new and useful Improvements in Electric-Light Adjusters; and I do hereby declare the following to be a full, clear, and exact description of the invention, such as will enable others skilled in the art to which it appertains to make and use the same.

This invention relates to improvements in lighting fixtures, and particularly to adjustable fixtures for supporting an incandescent bulb.

The principal object of the invention is to provide a device of this character which is of cheap and simple construction and by means of which the electric lamp may be moved in any direction, and held in such position.

Another object is to provide a simple device of this character which may be easily and quickly taken apart.

Other objects and advantages will be apparent from the description and with particular reference to the drawings.

In the drawings: Figure 1 is a side elevation of my bracket showing same adjusted to an angular position. Fig. 2 is a vertical longitudinal sectional view through the bracket. Fig. 3 is a horizontal sectional view on the line 3—3 of Fig. 2. Fig. 4 is a similar section on the line 4—4 of Fig. 2.

Referring particularly to the accompanying drawings, 10 represents the conduit through which the electric wires pass, said conduit being screw threaded on one end and engaged in a screw threaded socket 11 in the upper end of the portion 12 of the fixture. This portion of the fixture is preferably semispherical and hollow and on the inner edge portion are formed the cylindrical threads 13 which are adapted to receive the externally threaded portion of a ring 14. This ring has formed interiorly thereon a circular channel 15, in which is disposed a split spring band or ring 16. Threaded into one side of the ring 14 and engaging the outer face of the band or ring 16 is a set screw 17, by means of which the said ring 16 is compressed.

A hollow ball 18 is inserted within the rings 14 and 16, said ring 16 being normally of a diameter slightly less than that of the ball 18, so that when the ball is inserted within the ring, said ring will hug the ball snugly. In the inner side of the ball, that is the portion of the ball adjacent the socket 11, is a recess 19, in the bottom wall of which is formed an opening 20 to receive the electric wires 21 from the conduit 10. In a diametrically opposite point in the ball 18 is formed a threaded socket 22 to receive the threaded end of a sleeve 23, said sleeve having an open ended slot in one side of its free end to permit the projection therethrough of a switch key 24 of the lamp socket 25, which is inserted in the outer end of the said sleeve. In one side of the sleeve is a set screw 26 which engages with the socket beneath one of the ribs or flanges to hold the socket within the sleeve.

When it is desired to move the light in any given direction, the screw 17 is loosened and the lamp moved in the direction desired after which the screw is tightened to bind the ring against the ball 18 to hold the same in such adjusted position.

The sleeve 23 may be removed from the ball 18, the ball 18 removed from the rings 14 and 16, and said ring removed from the member 12 so that ready access to all of the parts for any purpose desired can be had.

What is claimed is:

In an adjustable electric light bracket, a standard member, a channeled ring removably engaged in a stationary member, a resilient band mounted in the channel of the said ring, a ball mounted for rotation within the band and ring, means on the ring for forcing the band outwardly into engagement with the ball, and means carried by the ball for holding an electric light socket.

In testimony whereof, I affix my signature, in the presence of two witnesses.

JUSTIN L. RAWSON.

Witnesses:
WILLIAM H. LORD,
ANNIE J. HAYES.